March 14, 1944.    J. E. McBRIDE ET AL    2,344,155
FREE TROLLEY SYSTEM
Filed April 20, 1942    3 Sheets-Sheet 1
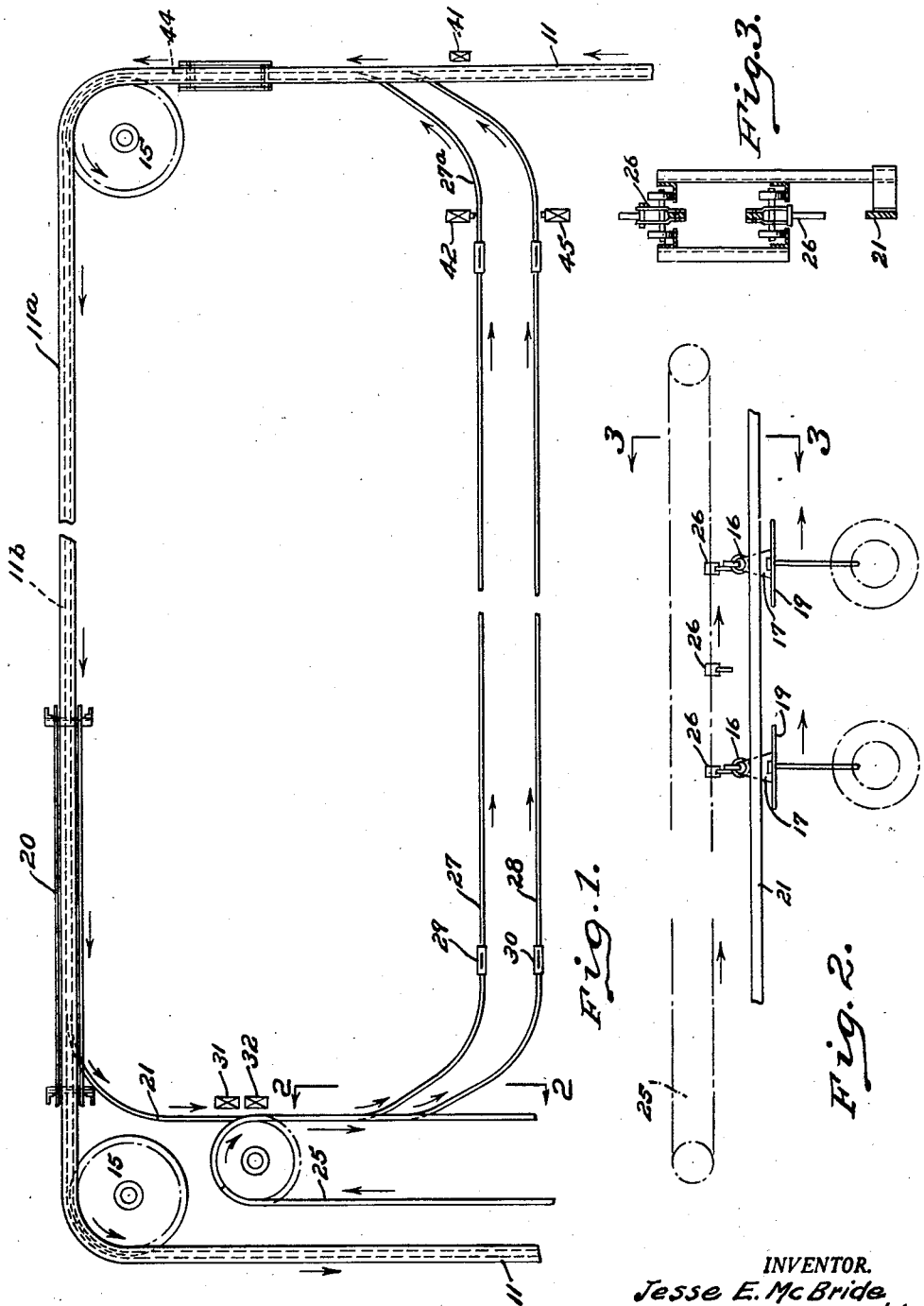
INVENTOR.
Jesse E. McBride
Eugene E. Landahl
BY Joseph Farley
ATTORNEY March 14, 1944.  J. E. McBRIDE ET AL  2,344,155
FREE TROLLEY SYSTEM
Filed April 20, 1942   3 Sheets-Sheet 2
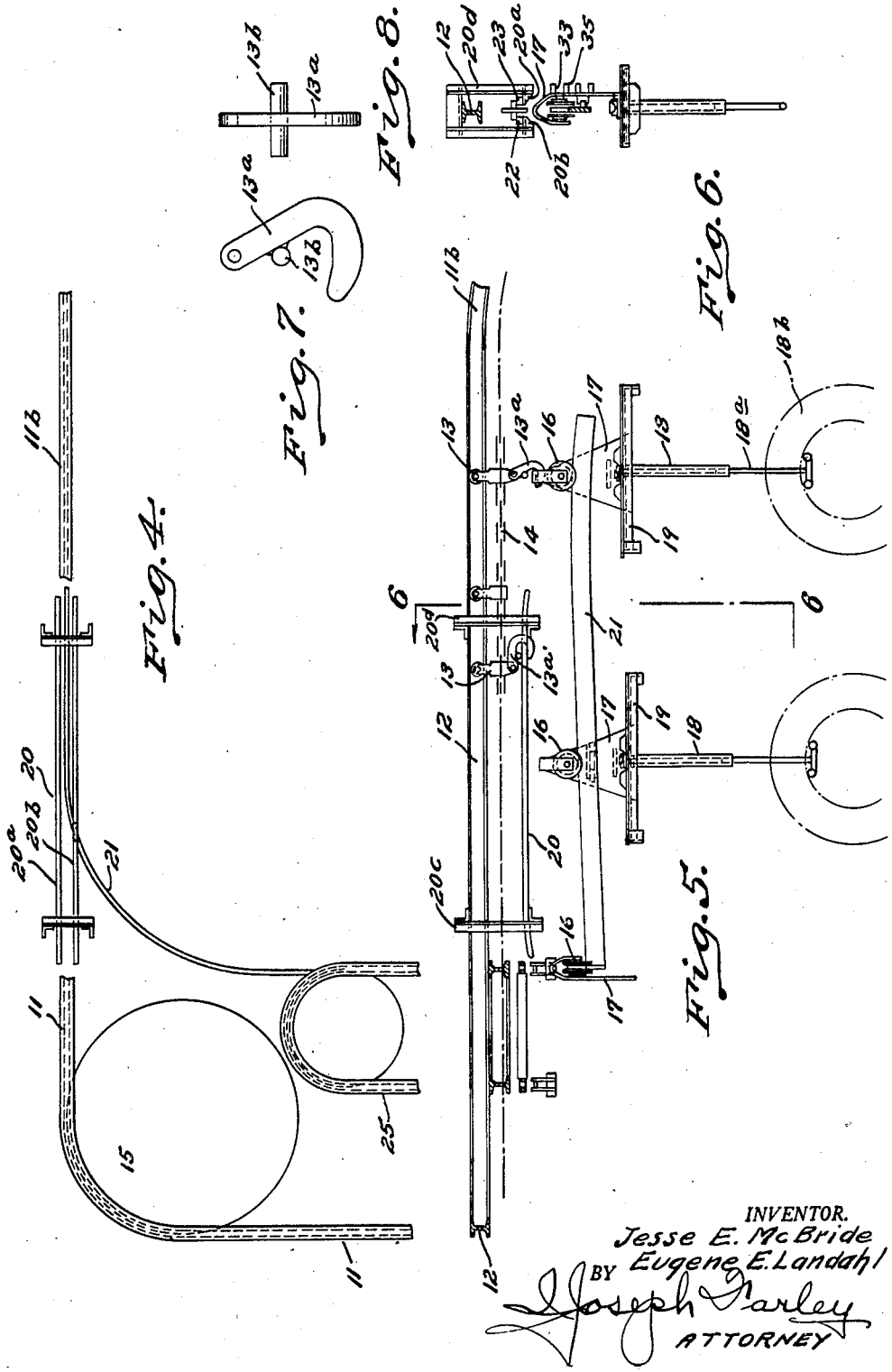
INVENTOR.
Jesse E. McBride
Eugene E. Landahl
BY Joseph Farley
ATTORNEY

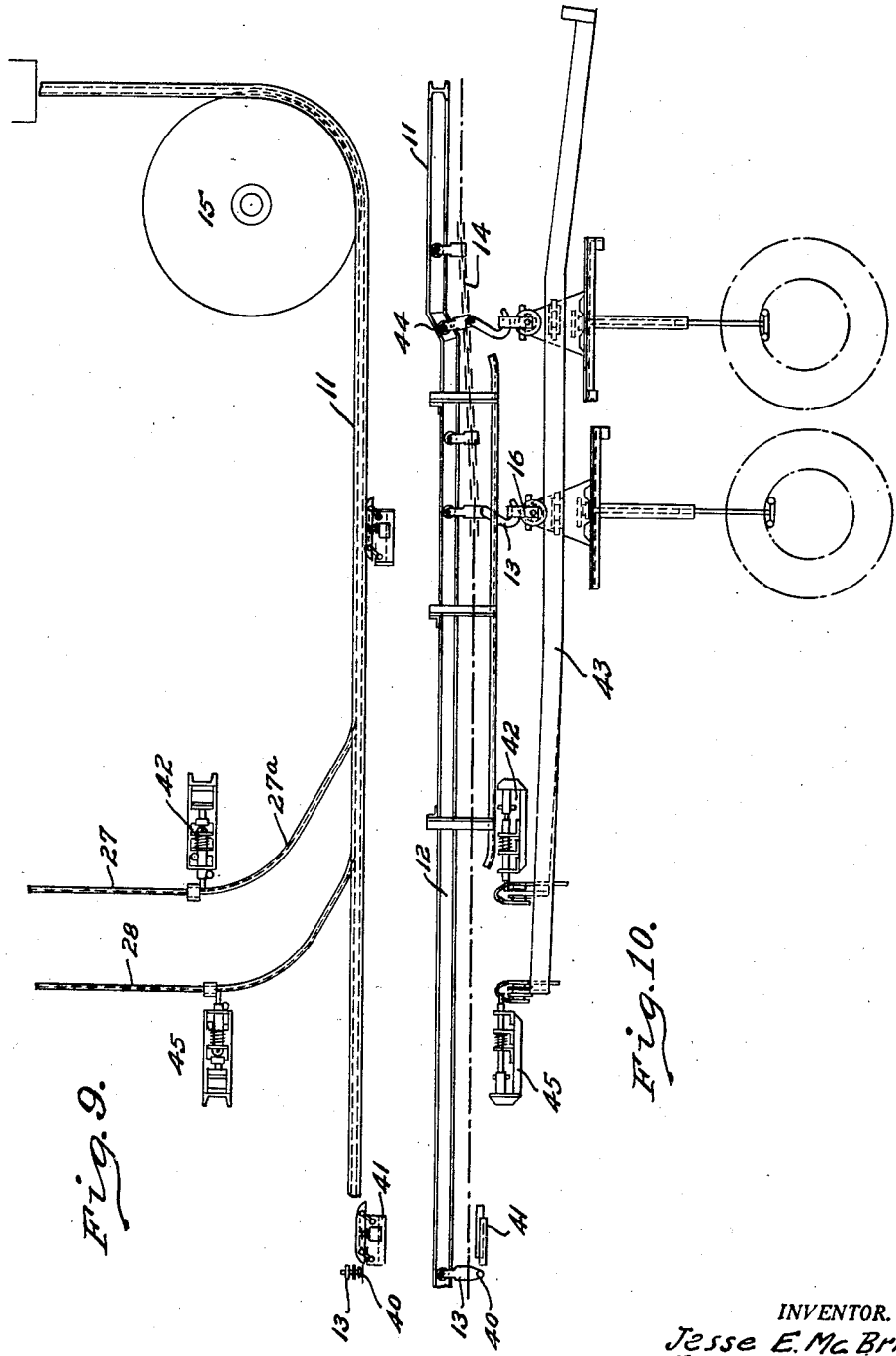

Patented Mar. 14, 1944

2,344,155

UNITED STATES PATENT OFFICE 2,344,155

FREE TROLLEY SYSTEM

Jesse E. McBride, Highland Park, and Eugene E. Landahl, Detroit, Mich., assignors to Palmer-Bee Company, Detroit, Mich., a corporation of Michigan Application April 20, 1942, Serial No. 439,648

6 Claims. (Cl. 104—91)

This invention relates to a conveyor system such as may be used to facilitate the handling of numerous types of articles during manufacturing processes. This specification is entitled "Free trolley system" since the invention permits the use of the free type trolleys to convey materials in combination with a so-called overhead or power driven conveyor.

In the conveying field, the term "free trolley" is used to designate a conveying device which does not form an integral part of a conveyor line, but one which is capable of being moved along its own track by hand, by gravity or with the aid of a power driven pusher unit which is not positively fastened to the free trolley but exerts a push thereon thru a lug or other contact member. Such free trolleys find many applications as, for example, in instances where manufacturing processes require that articles be left at certain stations for a period of time or where articles are to be moved intermittently.

Free trolleys are also useful in cases where articles have to be moved to any one of a number of points on substantially the same working level, since with free trolleys it becomes possible to employ a number of different tracks all interconnected by switches with pusher drives on individual tracks if and where required.

However, where it is necessary to transfer articles from one floor level to another or to make a transfer where it is necessary that positive support and drive be given to the load, the so-called power driven overhead conveyor is used and in such an installation the trolleys are fastened at spaced intervals in the conveyor chain and have suitable conveying units suspended therefrom. Such a conveyor is more positive in its operation and is, of course, necessary under the conditions above mentioned. In certain types of manufacturing operations, articles may be best carried on a free trolley system for the portion of the manufacturing process where an intermittent movement is desired and at other points in the transfer through the plant it has been found advantageous to transfer the material to power driven conveyors, such a transfer, of course, requiring additional labor and time.

It is the primary object of the present invention to provide a conveyor system wherein the advantages of both the free trolley and the power driven conveyor are made available when required by the provision of mechanism which will convert the free trolley units into the equivalent of power driven units at such times and under such conditions as the power driven type be required while providing free trolley units without conversion in other parts of the system.

It is the further object to provide definite transfer stations for converting the conveying units from the equivalent of the free trolley type to the equivalent of the power conveyor type, or vice versa, the transfer being effected by mechanism which is so arranged in its operation as to require a minimum of attention from an operator.

The above and other objects of the invention will appear more fully from the following more detailed description and by reference to the accompanying drawings forming a part hereof and wherein:

Fig. 1 is a plan view containing a diagrammatic showing of a power driven conveyor which is correlated with a free trolley system, showing stations for pick-up and discharge of free trolleys.

Fig. 2 is a view taken along the line 2—2 of Fig. 1 showing an elevation of a portion of the free trolley system and the pusher drive therefor.

Fig. 3 is a view taken along the line 3—3 of Fig. 2 on an enlarged scale.

Fig. 4 is an enlarged view of a portion of the conveyor system shown in Fig. 1.

Fig. 5 is an elevation of the view of Fig. 4 showing the construction of a discharge station where the free trolleys are transferred from the power driven conveyor to their own track.

Fig. 6 is a sectional view taken along the line 6—6 of Fig. 5.

Figs. 7 and 8 are enlarged side and end views, respectively, of a hook pivotally mounted on the power driven conveyor trolleys to pick up and support a free trolley unit.

Fig. 9 is a plan view of a portion of the conveyor system in Fig. 1, wherein the free trolleys are transferred from their track and picked up by the main power driven conveyor.

Fig. 10 is a side view of the structure shown in Fig. 9.

In the diagrammatic layout of the conveyor system shown in Fig. 1, which incorporates the device of this invention, a power driven conveyor of the overhead type is represented by the reference numeral 11. Referring also to Figs. 5 and 10, it will be seen that this conveyor comprises the usual track 12 which carries a plurality of trolleys 13 spaced in and supported on a conveyor chain 14, this chain being trained about suitable sprockets such as shown at 15. Arrows indicate the direction of travel of this conveyor in Fig. 1. As shown in Figs. 5, 6, 7 and 8, the trolleys 13 have a hook 13a pivotally supported at the lower portion with the trip pin 13b secured thereto as shown in Fig. 7. These hooks are for the purpose of contacting and supporting the free trolleys in such manner as to produce, in effect, a complete power driven trolley unit when a hook 13a engages and supports a free trolley as will later be described. The free trolleys above mentioned are shown in Figs. 5, 6 and 10, where the various parts of each of these trolleys are shown to comprise a trolley wheel 16 supported upon a bracket 17 so formed, as shown best in Figs. 5 and 6, as to both support the wheel 16 and form an opening to receive the hook 13a. The bracket 17 also serves to connect the trolley with the load supporting member 18 and the bumper portion 19 which serves to space the trolley from adjacent trolleys. The load supporting portion 18 is provided with a suitable load carrying member 18a and in the device illustrated the member 18a is particularly designed for carrying rubber tires such as indicated at 18b in Fig. 5. However, it is obvious that the detailed construction of the load carrying portions of the trolley is not of particular importance to the general operation thereof.

In the region marked 11a in Fig. 1, the power driven conveyor may be, and generally is, directed to carry material to another level in the factory, or to another floor. As the diagrammatic showing in Fig. 1 indicates by the broken section to the left of 11a, the conveyor 11 may again bring its power driven trolleys back to the same level as at 11b in Fig. 1. During the portion of the travel of the conveyor 11 indicated by the portions 11a and 11b, it is intended that the free trolley and the power trolley portions of the unit will be carried together, that is, the hook 13a will carry the free trolley portion 16, 17 as a complete power driven unit.

With the power driven trolleys on the same level as indicated at 11b in Fig. 1, let it be assumed that it is now desirable to convert the power driven trolley system into a free trolley system and mechanism is, therefore, interposed in the system to trip the free trolleys from their support on the hooks 13a of the trolleys 13 and to switch them onto a free trolley track. Such a mechanism is shown at 20 in Figs. 1 and 4 and in more complete detail in Figs. 4, 5 and 6 and referring to these figures the device for discharging the free trolleys from the trolley hook 13a power driven conveyor will now be described.

The power driven trolley hook conveyor with its spaced trolleys 13 driven by chain 14 with the trolleys carried on track 12 has previously been generally described. And as shown in the right hand portion of Fig. 5, there is a free trolley 16 carried on the hook 13a and as the chain 14 is driven toward the left as viewed in Fig. 5, the wheel 16 of the free trolley is carried into position to engage a track 21 appropriately positioned beneath the track 12. The previously mentioned tripping mechanism 20 is supported from the track 12 and comprises two tripper bars 22, 23 supported from suitable supporting frames 20c, 20d from the lower end of which the bars 22, 23 are supported by the bracket members 20a, 20b. As will be seen from inspection of Fig. 5, the right hand ends of the tripper bars are curved downwardly so that as the chain 14 carrying the trolleys 13 moves toward the left, the hooks 13a will be tripped by the engagement of the extending portions of the pins 13b. The hook 13a will then be in the position shown by 13a' in Fig. 5 and with such position of the hook 13a, the trolley 16 will be released from the hook and will necessarily be supported on the track 21 as a free trolley as shown at the left in Fig. 5. The track 21, as shown by the plan view of Fig. 4 is curved to direct the free trolley along the track toward the pusher type conveyor chain 25 shown in Fig. 4 and as also appears in Figs. 1 and 2 with arrows indicating direction of movement thereof. As indicated in Fig. 2, the pusher type trolley has spaced projecting members 26 adapted to contact and exert a push on the free trolley units. The track 21 is connected thru suitable switches with the free trolley tracks 27 and 28. These tracks may be positioned and disposed as needed in the factory to carry material on the free trolleys into position for work to be done thereon. An example might be vulcanizing in a factory manufacturing rubber tires. It is also understood that the tracks 27 and 28 may each be provided with suitable pusher type conveyor units such as 25, and each pusher type unit is independently controlled. Each of the tracks 27 and 28 is provided with an entrance track switch, shown at the left hand end in Fig. 1, the switch for track 27 being numbered 29 and the switch for track 28 being numbered 30. These switches are preferably electrically controlled by cam operated electrical control switches adjacent the track 21, the electrical means for operating the entrance track switch 29 being controlled by the switch 31 and the entrance track switch 30 controlled by control switch 32. Each of these switches 31, 32 mounted adjacent the track 21 is of the general type shown at 41 in Fig. 9, the switch being operated by a cam attached to a trolley as described below. In practice, it may be desired to distribute a plurality of free trolleys in a group on either track 27 or track 28 and for accomplishing this purpose a cam is attached to the leading or first free trolley of the group, such a cam being shown at 33 in Fig. 6. The cam 33 may be positioned at a height which will only actuate the control switch 31, for instance, and through the required electrical circuit such an actuation will bring the entrance track switch 29 into contact with the bar track 21 thus guiding the plurality of free trolleys onto the track 27. It is not considered necessary to include details of the solenoid or other electrically operated mechanism which may be used to operate the track switch 29 when the control switch 31 is actuated, such equipment being standard in the trade. For the purpose of the diagrammatic showing of Fig. 1 the track switches 29 and 30 may be considered as including the entire curved track portion to the left of the switch actuators indicated by the lead lines from numerals 29 and 30 and the connection of either track 27 or 28 with the track 21 is thereby effected when the end of the curved portion of the switch 29 or 30 is brought in contact or in alignment with the track at 21. The last trolley of the group desired to be placed on the same track as the leading trolley may be provided with a wheel 16 of larger flange suitable to contact a portion of the control switch 31 adjacent the track to throw out the switch contact controlling entrance track switch 29 and thus terminate the contact of track 27 with the track 21. The next leader of the group of trolleys may have a switch cam welded at a position appropriate to contact the control switch 32 which, it will be remembered, controls the entrance track switch 30 and such actuation will put track 28 in contact with track 21 and put the group of trolleys on track 28. It is, of course, understood that the same actuating mechanism is included on the last trolley of the group as was described with reference to the switch 31 so that with the switch 32 also the last trolley of the group will cause the opening of that switch and the release of track 28 from contact.

It has previously been mentioned that each of the tracks 27 and 28 may have a separate pusher conveyor drive such as illustrated at 25 in Fig. 2. This pusher drive for each of the tracks 27 and 28 is preferably independently controlled manually, and may be started and stopped at will. In most installations, it will be advisable to bring the free trolleys to a predetermined desired position and perhaps hold them there for a considerable period of time. However, when it is desired to remove a train or group of trolleys from track 27, for instance, the pusher conveyor 25 for that trolley can be started in motion and will carry the group of free trolleys toward the right hand end of the track 27 as shown in Fig. 1.

Referring now to Figs. 1, 9 and 10, the conveyor 11 is in continuous movement and each of the trolleys 13 has a projecting contact member 40 secured thereto which is shown in Fig. 9. As each of these trolleys 13 approach the point where the track 27 joins conveyor 11, the member 40 will contact a cam operated control switch 41 which controls the actuation of solenoid plunger stop mechanism 42. If the pusher conveyor has pushed a free trolley against the solenoid stop 42, the actuation of the control switch 41 will cause the solenoid plunger to pull its stop away and allow the free trolley to roll by gravity down the curved portion 27a of track 27 and eventually onto the pickup track 43 in Fig. 10. As the hooks 13a of the trolley 13 are in alignment with the top of bracket 17 of the free trolleys, the hooks will contact and pickup these trolleys as the hooks 13a move into engagement therewith. The track 12 of the conveyor 11 has an upwardly extending portion 44 as shown in Fig. 10 which results in lifting the free trolley and hook assembly upwardly effecting complete disengagement of the free trolley from the pickup track 43 and the power driven trolley hook conveyor therefor carries the trolley along the path of the chain 14. As other trolleys 13 approach and contact control switch 41, the plunger stop 42 will be successively actuated and as long as a free trolley unit is available against the stop it will be released to be picked up by the power hook trolley 13 which actuated switch 41. Trolleys can be similarly released from track 28 if the operator starts the pusher conveyor of that track to bring out the trolley group carried thereon, the switch 41 will actuate solenoid plunger stop 45. It is noted that in both solenoid units 42 and 45, the stop is only held open while the switch 41 is on contact, a spring retracting the stop thereafter. The length of the shoe on switch 41 is designed to allow the necessary time to effect release of a trolley past the solenoid stop.

The trolleys thus hooked onto the power driven trolleys 13 can now be taken to different levels and may be more positively carried than is possible in a free trolley system.

The installation above described has been found practical in actual operation in a plant manufacturing rubber tires and has been selected for the purpose of illustrating the general principles of the invention. It is to be understood, however, that in other types of installations, certain variations in the detailed construction of the several units will be necessary while maintaining the fundamental principles of the several units, making available the effective advantages of both the power driven conveyor and the free trolley conveyor in a single system employing free trolleys as the basic load carrying unit, these free trolleys being successfully picked up by, and released from, the power driven conveyor at desired points in the system.

We claim:

1. In a conveying mechanism, a power driven chain, a trolley secured for movement with said chain, a pivoted hook suspended from said trolley, a free trolley unit, a track for said free trolley unit positioned at a point in its travel to carry said free trolley under said hook of said power driven trolley whereby said hook of said power trolley connects in positive supporting engagement with said free trolley, a trip mechanism at another point in said power driven trolley system for releasing said hook from connection with said free trolley unit.

2. In a conveying system, a continuously operating main power driven conveyor comprising a power driven chain with spaced trolleys mounted thereon, each of said trolleys having a pivotally mounted hook carried thereby, a free trolley conveyor comprising a track, a first transfer station between said main power driven conveyor and said free trolley conveyor which consists of a portion of said track extending in parallelism below said power driven conveyor, a plurality of free trolley units placed for movement on said track, each of said free trolley units having a looped portion for engagement by one of said pivotally mounted hooks, said hooks automatically engaging with the looped portion of said free trolley units as the latter pass along that portion of said track which extends below said power driven conveyor and said power driven conveyor having an upwardly extending portion for raising said free trolley units clear of the said free trolley conveyor track after said hooks have been engaged in the looped portion of said free trolley units.

3. A conveying system as set forth in claim 2 in which a second free trolley conveyor is mounted adjacent said main power conveyor at a point remote from said first transfer station, said second free trolley conveyor also having a track portion located in parallelism with and below said main power driven conveyor and transfer means interposed between said power driven conveyor and said second free trolley system, said transfer means comprising means for tilting said pivotally mounted hooks upon their pivotal mounting to release the same from the looped portion of said free trolley units.

4. A conveying system as set forth in claim 2 in which a second free trolley conveyor is mounted adjacent said main power conveyor at a point remote from said first transfer station, said second free trolley conveyor also having a track portion located in parallelism with and below said main power driven conveyor and transfer means interposed between said power driven conveyor and said second free trolley system, said transfer means comprising means for tilting said pivotally mounted hooks upon their pivotal mounting to release the same from the looped portion of said free trolley units, an independently operated pusher conveyor drive located adjacent to said second free trolley conveyor and having a plurality of spaced trolley units carried thereby, each of said spaced trolley units having a pusher dog for engagement with the looped portion of said free trolley units.

5. A conveying system as set forth in claim 2 in which a second free trolley conveyor is mounted adjacent said main power conveyor at a point remote from said first transfer station, said second free trolley conveyor also having a track portion located in parallelism with and below said main power driven conveyor and transfer means interposed between said power driven conveyor and said second free trolley system, said transfer means comprising means for tilting said pivotally mounted hooks upon their pivotal mounting to release the same from the looped portion of said free trolley units, an independently operated pusher conveyor drive located adjacent to said second free trolley conveyor and having a plurality of spaced trolley units carried thereby, each of said spaced trolley units having a pusher dog for engagement with the looped portion of said free trolley units, track switches interposed between said first free trolley conveyor and said separate pusher conveyor and electrical switch means operated by said trolley units for causing said track switches to be moved to and from operative relationship with said separate pusher conveyor.

6. A conveying system as set forth in claim 2 in which a second free trolley conveyor is mounted adjacent said main power conveyor at a point remote from said first transfer station, said second free trolley conveyor also having a track portion located in parallelism with and below said main power driven conveyor and transfer means interposed between said power driven conveyor and said second free trolley system, said transfer means comprising means for tilting said pivotally mounted hooks upon their pivotal mounting to release the same from the looped portion of said free trolley units, an independently operated pusher conveyor drive located adjacent to said second free trolley conveyor and having a plurality of spaced trolley units carried thereby, each of said spaced trolley units having a pusher dog for engagement with the looped portion of said free trolley units, said first free trolley conveyor also comprising track sections remote from said main power driven conveyor and said pusher conveyor, pivotally mounted track switches for connecting said remote track section in operative relationship with the track sections of said pusher conveyor, electrical control switches operated by said trolley units for causing said track sections to be selectively moved into or out of operative positions, and means under control of the trolley units of the main power conveyor for governing the passage of said free trolley units into operative relationship with said power driven conveyor.

JESSE E. McBRIDE.
EUGENE E. LANDAHL.